United States Patent [19]
Schultz et al.

[11] 3,837,603
[45] Sept. 24, 1974

[54] LATERAL AXIS ROLLOUT, GO-AROUND, TAKEOFF CONTROL FOR AIRCRAFT

[75] Inventors: Elmer L. Schultz, Marion, Iowa; Robert F. Tribuno, Santa Monica, Calif.; John C. Hall, Cedar Rapids, Iowa; Theodore J. Schuldt, Jr., Thousand Oaks, Calif.

[73] Assignee: Collins Radio Company, Dallas, Tex.

[22] Filed: Jan. 4, 1973

[21] Appl. No.: 321,117

[52] U.S. Cl. ........ 244/77 A, 73/178 T, 235/150.22, 318/585, 318/586, 343/108 R
[51] Int. Cl. ............................................. B64c 13/18
[58] Field of Search. 73/178 T; 235/150.22, 150.26; 244/77 R, 77 B, 77 C, 77 E, 77 A; 318/585, 586; 340/27 NA; 343/108 R

[56] References Cited
UNITED STATES PATENTS
2,808,999  10/1957  Chenery............................ 244/77 G
2,998,946  9/1961  Jude et al. ........................ 244/77 A
3,002,713  10/1961  Noxon et al. ...................... 244/77 A
3,203,652  8/1965  Doniger et al. .................... 244/77 A
3,335,980  8/1967  Doniger et al. .................... 244/77 A
3,345,017  10/1967  Olah ................................ 244/77 A
3,361,392  1/1968  Doniger et al. .................... 244/77 A
3,373,958  3/1968  Sims................................ 244/77 E
3,382,351  5/1968  Schweighofer et al. ........ 235/150.22

Primary Examiner—Trygve M. Blix
Assistant Examiner—Stephen G. Kunin
Attorney, Agent, or Firm—Richard W. Anderson; Robert J. Crawford

[57] ABSTRACT

Automatic control of aircraft which provides runway centerline guidance during landing rollout, takeoff roll and low altitude initiated go-around flight modes, wherein lateral dispersion is minimized during a go-around manuever for the case of an outboard engine.

1 Claim, 4 Drawing Figures

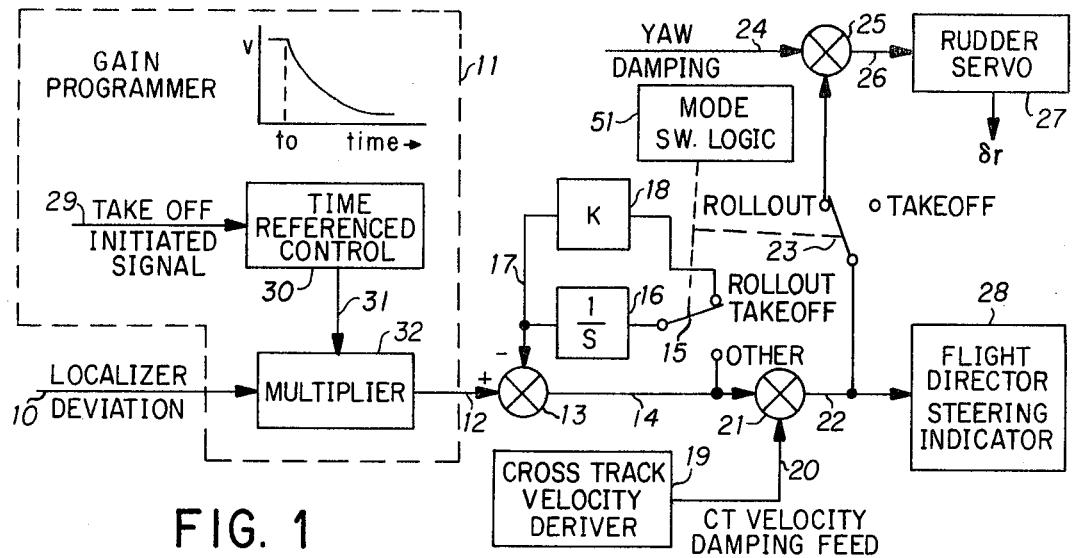
FIG. 1
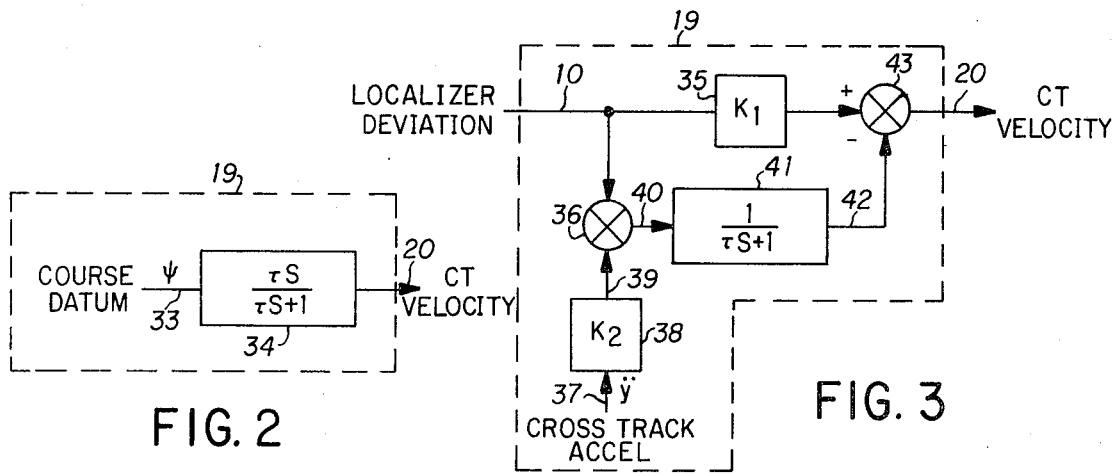
FIG. 2
FIG. 3
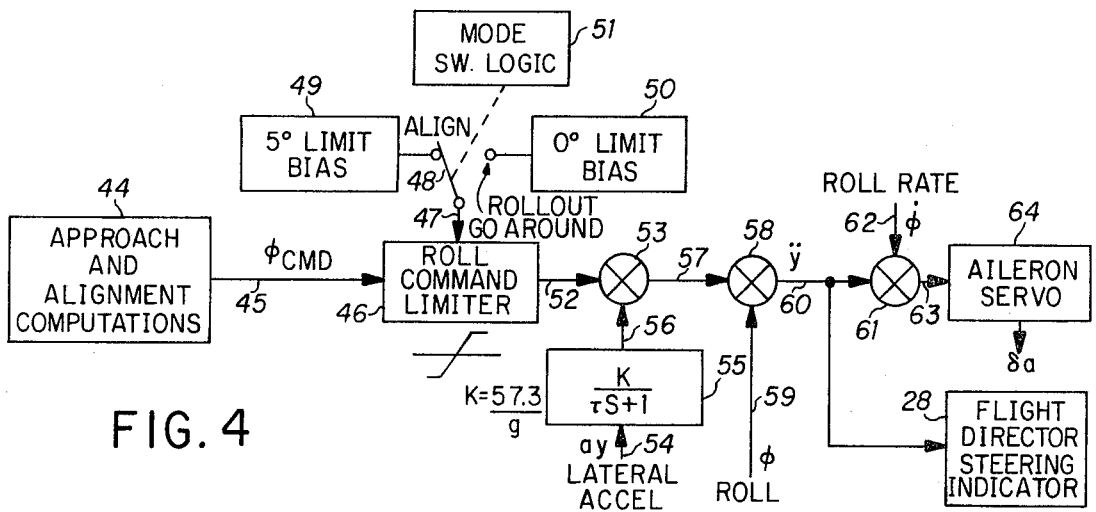
FIG. 4 ically aileronfrom a conventional aileron...

LATERAL AXIS ROLLOUT, GO-AROUND, TAKEOFF CONTROL FOR AIRCRAFT

This invention relates generally to automatic control of aircraft and more particularly to a lateral axis control system for use in Category III automatic flight control systems to provide guidance control during aircraft rollout upon landing, takeoff roll during takeoff mode, and initial lateral axis control upon go-around mode initiation.

Prior to Category III aircraft control systems, wherein an aircraft is controlled throughout all phases of a landing including touchdown and rollout to taxi speed, and wherein runway centerline tracking is additionally provided during takeoff roll mode, there arises a need for control laws by means of which the aircraft may be automatically guided during these operational modes.

Accordingly, the object of the present invention is the definition, and implementation of, control laws for lateral axis rollout, go-around and takeoff roll aircraft guidance modes.

The present invention is featured in the definition and implementation of a yaw axis control law for rollout and takeoff modes which utilizes a mix of localizer deviation and derived cross-track velocity for centerline tracking by either automatic or manual operation.

The present invention is further featured in the provision of a roll axis control law definition and implementation for aircraft rollout and go-around modes which basically flies cross-track acceleration to zero.

These and other features and objects of the present invention, and the manner in which the control law formulation and implementation of the present invention is uniquely applicable to non-airborne steering control, and go-around mode initiation at the lower altitude required in Category III, will become apparent upon reading the following description with reference to the accompanying drawing in which:

FIG. 1 is a functional block diagram of a yaw axis rollout control law in accordance with the present invention;

FIG. 2 is a functional representation of a method of deriving cross-track velocity for use in the system of FIG. 1;

FIG. 3 is a functional diagram of a further means for implementing cross-track velocity for use in the system of FIG. 1; and FIG. 4 is a functional block diagram of a roll axis control law for rollout and go-around modes in accordance with the present invention.

Yaw axis control for an aircraft during rollout and takeoff modes and for low altitude initiated go-around modes; wherein either the aircraft is not airborne and thus not subject to conventional control surface response, or may be precluded from a conventional aileron control; is distinctly and uniquely different from yaw axis control systems for automatic control of an aircraft during normal cruise and approach or landing modes.

With the advent of Category III automatic aircraft flight control systems, the need arises for automatic runway centerline guidance during aircraft takeoff roll, as well as during rollout after touchdown during a landing manuever. Typically, it is desirable to control the aircraft as to runway centerline alignment during the rollout phase of a landing until the aircraft velocity has diminished to taxi speed, and during the takeoff phase when aircraft centerline guidance is desired during the takeoff run and the initial phases of the climbout as well as during a go-around manuever initiated when an aircraft landing is mismanaged, or, especially when an outboard engine is lost.

The present invention relates to the provision of these automatic control features for an aircraft during takeoff roll, landing rollout and a go-around operational modes.

Because there is a known interaction between yaw axis and roll axis control as concerns lateral axis stability of an aircraft, the present invention provides a means for automatic rollout and takeoff control in the yaw axis of control and for automatic rollout and go-around control in the roll axis. The systems to be described are uniquely different from conventional yaw axis and roll axis control laws in that during landing rollout and takeoff modes the aircraft is essentially a land vehicle and only partially controllable by the control surfaces.

As such, control during the non-airborne modes is primarily derived from available localizer radio deviation, sensed lateral acceleration, and cross-track velocity derivations computed from available course datum signals.

Yaw Axis Rollout Control Law Implementation for Rollout and Takeoff Modes

FIG. 1 illustrates a yaw axis rollout control law for aircraft rollout after touchdown and aircraft takeoff roll operational modes by means of which the aircraft may be maintained on the runway centerline. The yaw axis control of FIG. 1 generally utilizes a mix of localizer radio deviation and derived cross-track velocity to maintain a centerline track. With reference to FIG. 1, a source of localizer radio deviation 10 is applied through a gain programmer 11 as a first input 12 to a signal combining means 13. Signal combining means 13 is embodied in a signal fader function comprised of mode switch 15, signal integrator 16 and gain factor means 18. When mode switch 15 is positioned in response to modes other than rollout or takeoff modes, the output 14 from signal combining means 13 is zero, since radio signal 12 applied to combining means 13 is applied as input to integrator 16 which integrates up to apply an output 17 in a substractive sense to signal combining means 13, so as to cancel out any existing radio deviation signal 12. Upon rollout or takeoff modes being initiated, switch 15 places element 18 across the integrator 16 such that the output 17 from the integrator bleeds off toward zero. As the output 17 bleeds towards zero, the existing radio deviation signal 12 applied to signal combining means 13 is faded in to the combining means output 14. Thus, upon rollout or takeoff mode being experienced, under the control of mode switching logic 51, the existing localizer radio deviation signal 12 from the gain programmer 11 is faded in as a first input to a further signal combining means 21.

Signal combining means 21 receives a second input 20 which comprises a cross-track velocity damping feed computed by a cross-track velocity deriver 19. The output 22 from signal combining means 21 is applied as an input to a flight director steering indicator 28 and additionally through a further mode switch 23

(in the rollout mode position thereof) to signal combining means 25. Conventional yaw damping signal 24 constitutes a second input to signal combining means 25, and the output 26 from signal combining means 25 is applied to rudder servo 27 to position the aircraft rudder and control the aircraft in yaw. During takeoff mode, as sensed by mode switching logic 51, mode switch 23 switches to the takeoff position to remove the localizer deviation signal from the automatic control imparted by the rudder servo 27, and the system reverts to a "flight director only" mode of operation. It is to be understood that the flight director steering indicator 28 constitutes any known yaw steering command display to which a pilot may respond and control an aircraft in yaw.

To compensate for increasing system gains which occur during takeoff roll due to increasing aircraft ground speed and localizer beam convergence as the localizer transmitter at the far end of the runway is approached, the gain programmer 11 of FIG. 1 provides appropriate compensation. The gain programmer 11 might be comprised of a signal multiplier 32 to which the localizer deviation input signal 10 is applied. The multiplier 32 is driven by a time-referenced control signal 31 from control 30. Control 30 might provide an exponentially decaying voltage which is initiated at takeoff mode engagement under the influence of a takeoff initiated control signal 29.

The exponential gain programming provided by programmer 11 thus compensates for the increasing system gains, as concerns localizer deviation, during takeoff roll, by counteracting the gain increase by an exponentially decaying multiplication factor so as to maintain the localizer deviation signal essentially constant during this mode of operation.

Derived cross-track velocity is employed in FIG. 1 as a damping feed 20 which is mixed with the localizer radio signal. FIG. 2 illustrates a first means which might comprise the crosstrack velocity deriver 19 of FIG. 1. Since cross-track velocity, for an aircraft tracking a runway centerline, is defined as the product of ground speed and the sine of the existing course datum angle, cross-track velocity is proportional to course datum, per se, for small course datum angles, and over a limited speed range. Thus FIG. 2 illustrates a course datum signal 33 (comprising the discrepancy between the experienced aircraft heading and the runway centerline course) being applied to a high pass filter 34 to provide an output 20 proportional to the cross-track velocity within the above defined operational limitations. Filter 34 provides a long washout utilized to eliminate standoff caused by compass errors as concerns the course datum signal 33.

A further means for deriving cross-track velocity is depicted in FIG. 3. Localizer deviation signal 10 may be applied through a first gain factor means 35 as an input to a signal combining means 43. The localizer signal is additionally applied as a first input to a further signal combining means 36. The second input to combining means 36 comprises the output 39 from a further gain factor means 38 to which a cross-track acceleration, as might be obtained from a lateral accelerometer, is applied. The output 40 from signal combining means 36 is applied through a lowpass filter 41 the output 42 of which is applied as a second (subtractive) input to comparing means 43. The output 20 from comparing means 43 comprises a signal proportional to cross-track velocity. In operation, the cross-track velocity derivation means depicted in FIG. 3 comprises a blend of localizer deviation and cross-track acceleration from a complementary filtering arrangement which utilizes the optimum frequency components of each raw input.

The aforedescribed fading arrangement, by means of which localizer deviation is applied to the output signal mix in FIG. 1, minimizes the rudder transient due to engaging roll-out mode with a centerline offset. The fader action smoothly fades in the localizer deviation after rollout mode engagement. The ensuing yaw command signal is therefore developed in a manner such that the velocity vector of the aircraft remains nearly parallel to the runway centerline until speed is reduced, with only a long term turn manuever towards the runway centerline. The advantage of such a system is obvious when considering rollout maneuvers on an icy runway wherein a violent maneuver might give rise to a dangerous skid. Thus the system of FIG. 1 employs fading in localizer radio deviation upon rollout mode being initiated by means which memorizes the localizer radio prior to rollout due to the integrating action and fades in localizer radio slowly upon rollout initiation to prevent an abrupt maneuver.

Although primarily described above as a landing rollout mode steering control, the system of FIG. 1 additionally provides a satisfactory control for runway centerline tracking during aircraft roll during takeoff, where a steering signal is typically displayed on a yaw steering pointer, as indicated by the application of the yaw steering command output 22 to a flight director indicator 28. Since aircraft takeoff is a manual mode only, FIG. 1 depicts, by means of mode switch 23, that the steering signal formulated from radio and cross-track velocity damping is removed from the automatic control channel feeding the rudder servo during takeoff mode.

Roll Axis Control Law Implementation for Rollout and Takeoff Modes

FIG. 4 illustrates in accordance with the present invention, a roll axis control law implementation usable for both rollout and go-around modes. The system of FIG. 4 basically provides a control which flies cross-track acceleration to zero. At rollout or go-around, a roll command limit is reduced to zero thereby essentially removing all outer loop guidance from the control. Control is then realized through a mix of roll signal and lateral acceleration applied through a gain of 57.3/g., which comprises cross-track acceleration.

With reference to FIG. 4, the roll axis control law implementation for rollout and go-around modes comprises a source of approach and alignment bank command computations 44 from which a bank command 45 is applied to a roll command limiter 46. The command limit imposed by roll command limiter 46 is governed by mode switching logic 51 so as to be, for example, 5° in align mode and 0° in rollout or go-around modes. The align position of switch 48 applies a 5° limit bias 49 as input 47 to the roll command limiter 47 so as to establish the limit at ±5°. Mode switching logic 51, in positioning mode switch 48 to the rollout/go-around position, establishes a 0° limit by a source 50 as input 47 to the roll command limiter. The bank command output 52 from the roll command limiter 46 is mixed in signal combining means 53 with the output 56 from a lowpass filter 55 the gain of which is established by making K equal 57.3/g. A lateral accelration input $a_y$ is applied as input 54 to the filter 55. The output 57 from signal combining means 53 is applied as a first input to a further combining means 58 which receives a roll input 59. The mix of roll and a lateral acceleration (the latter applied through a gain of 57.3/g) provides an output 60 from combining means 58 which is proportional to cross-track acceleration $\ddot{y}$. Cross-track acceleration signal 60 is applied to a flight direction steering indicator 28 to provide a bank command indication for a pilot, and is additionally applied through a combining means 61 as a roll command input 63 to aileron servo 64. Roll rate $\dot{\Phi}$ is applied as a second input 62 to signal combining means 61 for damping purposes.

In operation, it is seen that, in align mode, a roll command output 52 from command limiter 46 is mixed with filtered lateral acceleration and roll to develop the output roll command signal, with the computed bank command signal 45 being limited at ±5° in roll command limiter 46. In rollout and go-around modes, the limit of the roll command limiter 46 is faded to zero, thus effectively removing all outer loop guidance from the control and the output roll command signal becomes cross-track acceleration only.

The advantages of a cross-track acceleration ($\ddot{y}$) control are:

1. Wing-down cross-wind compensation existing prior to rollout or go-around is not removed at initiation of these modes. This is true if the roll command signal into the roll command limiter 46 is zero prior to mode initiation and if the roll command signal into the limiter prior to mode initiation is other than zero, roll attitude will be changed slightly.

2. Disturbances in rollout and go-around are sensed inertially and compensated for.

3. Lateral dispersions due to loss of an outboard engine in go-around are significantly reduced.

The present invention is thus seen to provide a means for aircraft centerline guidance during rollout and takeoff modes and initial course guidance during go-around. The control system incorporates a yaw axis control law which utilizes a mix of localizer deviation and derived cross-track velocity and a roll axis control law for rollout and go-around modes based essentially on flying cross-track acceleration to zero.

Although the present invention has been described with respect to particular embodiments thereof, it is not to be so limited, as changes might be made therein which fall within the scope of the invention as defined in the appended claims.

I claim:

1. A yaw axis control system for landing strip centerline guidance during takeoff and landing rollout operational modes of an aircraft comprising: a source of localizer radio deviation signal; means for deriving a signal proportional to cross-track velocity of said aircraft comprising a lateral accelerometer, means for combining the output signal from said lateral accelerometer with said localizer radio deviation signal, lowpass filtering means receiving the output from said means for combining, said localizer radio deviation signal and the output of said means for combining being applied as mutually subtractive inputs to a further means for combining, the output of said further means for combining comprising a derived crosstrack velocity signal; a further signal combining means receiving said localizer radio deviation and derived cross-track velocity signals and developing an output signal comprising a yaw command signal; and means responsive to said yaw command signal to position the rudder of said aircraft.

* * * * *